Sept. 19, 1967  C. K. STEDMAN  3,342,074
MOTION SENSING DEVICE WITH INERTIAL GAS FLOW
Filed March 4, 1964  6 Sheets-Sheet 1

INVENTOR.
CECIL K. STEDMAN
BY Mathis & Graybeal
ATTORNEYS

INVENTOR.
CECIL K. STEDMAN
BY Mathis & Graybeal
ATTORNEYS

Sept. 19, 1967　　　　　　　C. K. STEDMAN　　　　　　　3,342,074
MOTION SENSING DEVICE WITH INERTIAL GAS FLOW
Filed March 4, 1964　　　　　　　　　　　　　　　　6 Sheets-Sheet 3

INVENTOR.
CECIL K. STEDMAN
BY
ATTORNEYS

Sept. 19, 1967  C. K. STEDMAN  3,342,074
MOTION SENSING DEVICE WITH INERTIAL GAS FLOW
Filed March 4, 1964  6 Sheets-Sheet 4

INVENTOR.
CECIL K. STEDMAN
BY Mathis & Graybeal
ATTORNEYS

INVENTOR.
CECIL K. STEDMAN

BY Mathis & Graybeal

ATTORNEYS

INVENTOR.
CECIL K. STEDMAN
BY Mathis & Graybeal
ATTORNEYS

United States Patent Office

3,342,074
Patented Sept. 19, 1967

3,342,074
MOTION SENSING DEVICE WITH
INERTIAL GAS FLOW
Cecil K. Stedman, Enumclaw, Wash., assignor to Statham Instruments, Inc., Los Angeles, Calif., a corporation of California
Filed Mar. 4, 1964, Ser. No. 349,252
22 Claims. (Cl. 73—515)

The present invention relates to improvements in motion sensing devices of the type wherein a solid mass is suspended on a yieldable constraint for oscillatory movement within a case. More particularly, the present invention provides improvements in low frequency responsive vibration sensing instruments of the spring-mass type, such as linear accelerometers. By means of such improvements, the natural frequency of devices of this type is lower than that of conventional spring-mass systems with like range and deflection.

The primary problem addressed by the present invention is the problem of the degradation of the natural frequency of such instruments, rather than the acoustical damping thereof. As a solution to this problem, and to avoid the design problems characteristic of the use of a liquid medium for low frequency degradation (as in Stedman U.S. Pat. No. 3,065,639, for example), the present invention utilizes a gaseous medium for this purpose. The utilization of a gaseous dynamic mass for the purpose of lowering the natural frequency of such instruments is also to be distinguished from prior spring-mass systems employing gas damping, such as disclosed in Stedman U.S. Pat. No. 2,909,364, where movement of the suspended mass pumps a gaseous medium through a resistive element such as a porous plug or the like solely for acoustical damping purposes. The functional distinction between the utilization of a gaseous medium for natural frequency degradation and the use of a gas for damping purposes is that for effective degradation of the natural frequency the gaseous medium is utilized in a manner so that the dynamic impedance of the system has a substantial inertial component as well as a resistive impedance for acoustical damping at the natural frequency of the system. In prior systems utilizing gas flow simply for acoustical damping, the impedance arising from gas flow is primarily resistive and has no substantial inertial component.

Analysis and experimentation have shown that, while good degradation of natural frequency is realized by introducing an inertial component of impedance as a result of gas flow, this form of dynamic system is characteristically essentially undamped at a resonant frequency, unless auxiliary damping means is employed. Preferred forms of the present invention accordingly also employ the gaseous medium for auxiliary damping (i.e. to provide additional resistive impedance) as well as for inertial impedance. By way of example and as more fully discussed below, specific arrangements to this end include utilization of a primarily resistive gas flow path in shunt (i.e. parallel) with the gas flow path developing the inertial impedance, or utilization of a shunt resistive element (e.g. a porous plug) in series flow path with a spring (e.g. a diaphragm) acting to minimize resistive damping at relatively low frequencies and to accentuate resistive damping at relatively high frequencies. Further included as an optional damping technique is the proposition of making the primary flow path for the gaseous medium of a length to be resonant at the resonant frequency of the system, thereby providing a low essentially resistive impedance with consequent effective damping at the resonant frequency of the system.

In a spring-mass system the mass of the suspended member, hereinafter referred to as the "suspended mass," determines the range of the instrument for any given constraint. In dynamical systems according to the present invention this is also true, but the suspended mass contributes in but a minor degree to the mass of the dynamic system which governs the natural frequency of the system. In the present invention the body of gas in which the suspended member oscillates contributes what is hereinafter termed "dynamic mass," which in a major degree determines the natural frequency of the instrument. In preferred embodiments of the invention, the impedance contribution of the suspended mass is less than about 20% of the dynamic impedance of the system.

When the case of the instrument is subjected to vibratory motion, the gas is "pumped" from one side of the mass to the other by movement of the mass into and out of coupling chamber means at one or both ends of the suspended mass, with the suspended mass forming a part of said coupling chamber means. The inertia of the dynamic system of my invention is in major proportion governed by the inertia of a column of gas moving into and out of the coupling chamber means through a tube or like conduit intercommunicating the ends of the suspended mass. The natural frequency of the dynamic system is decreased by such inertia, without any increase in the size of the suspended mass. The range and the natural frequency of the system accordingly can be varied substantially independently of each other.

Ordinarily, to provide a conventional spring-mass instrument with a lower natural frequency, the size of the mass must be increased or the spring stiffness decreased. Either design variation results in an increase in the static deflection and decrease in the range and an increase in the size of the instrument.

Important operational advantages accrue from the utilization of a pumped gaseous medium rather than a liquid medium for dynamic mass to lower the natural frequency of the spring-mass system. One such advantage is that use of a gaseous medium avoids to a great extent the problem of temperature compensation inherent in use of a liquid medium, since the viscosity of a gas varies to a considerably lesser extent over the operating temperature range than does the viscosity of a liquid medium. Another advantage is that the inherent need for an expansion chamber to accommodate thermal expansion when using a liquid is eliminated.

Other and more specific aspects of the present invention relate to various constructional arrangements of linear accelerometers utilizing a pumped gas for dynamic mass. By way of example in this respect, one functionally important constructional feature here presented is that of a specific form of annular sealing diaphragm means between the suspended mass and the case of a linear accelerometer, which diaphragm means is comprised of a material which is readily flexed upon movement of the suspended mass but which is radially inextensible (i.e. has a high bulge ratio) so as to not of itself effect any substantial change in volume of the coupling chamber of which the diaphragm forms a part.

Other objects, features, advantages and characteristics of the present invention will be apparent from the following analytical and design considerations, and the following description of certain typical forms of dynamic systems based thereon, taken together with the accompanying illustrations wherein like letters and numerals refer to like parts and wherein.

Figure 4:
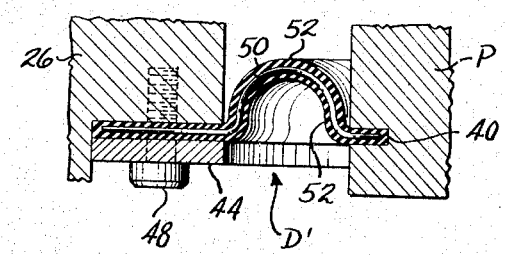
FIG. 4 is an enlarged cross-sectional view showing further constructional detail of a coupling chamber sealing diaphragm shown in FIG. 1.
Figure 5:
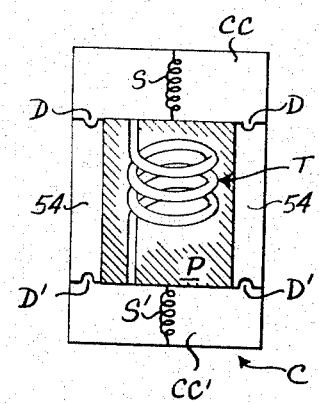
FIG. 5 is a schematic illustration of the dynamic system provided by the accelerometer shown in FIGS. 1–4.

Typifying the invention, the linear accelerometer shown at FIGS. 1–4, considered together with the diagrammatic showing thereof at FIG. 5, comprises a rigid assembly, collectively designated as case C, made up of the following components: open ended cylinder 20, end cap 22 affixed by bolts 24 to the housing 20, annular mounting block 26 attached by bolts 28 to the end cap 22, and spring retainer ring 30 attached by bolts 32 to mounting block 26. A suspended solid mass or piston P is mounted on yieldable constraints in the form of springs S, S', the inner portions of which are attached to the mass P, with the outer edge of spring S being retained between end cap 22 and the mounting block 26, and the outer edge of spring S' being retained between mounting block 26 and retainer ring 30, as shown. Respective spiral slots 34, 36 in the springs S, S' function to reduce stiffness thereof, and also provide sufficient openings therein so air flow past the respective spring elements S, S' is not materially impeded upon oscillation of the suspended mass P.

Respective diaphragms D, D' are arranged between the suspended mass P and the annular mounting block 26 to provide respective closed coupling chambers CC, CC' at the ends of the suspended mass P. The respective inner edges of the diaphragms D, D' are seated in respective annular slots 38, 40 in the suspended mass P and the respective outer edges of the diaphragms D, D' are attached to annular mounting member 26 by means of respective sealing rings 42, 44 and mounting bolts 46, 48. As best shown in the enlarged fragmentary view of FIG. 4, showing a portion of the diaphragm D' in radial cross-section, each of the diaphragms D, D' is preferably configured to have a single fold and preferably comprises radially arranged fibers 50 laminated between or within one or more elastomeric layers 52, with two such layers 52 (comprised of silicone rubber), being shown by way of example. Fibers 50 extend radially in the median plane of the diaphragms D, D' so that the diaphragms are radially inextensible yet easily flexed upon axial movement of the suspended mass P. Diaphragms D, D' are expressly designed to have a high bulge ratio, as more fully discussed hereinafter, so the diaphragms do not of themselves introduce any substantial change in volume in the coupling chambers CC, CC' when movement of mass P generates cyclic pressure differentials in the coupling chambers CC, CC'. The diaphragms D, D' are in sealing engagement with both the mass P and the annular mounting member 26, and the between-diaphragm interspace 54 can be filled with gas or with a hydraulic fluid, such as oil, as desired. A liquid of appropriate viscosity can be employed in the interspace 54, particularly when diaphragms having relatively low bulge ratios are used. A suitable type of liquid for this purpose is DC200, a silicone oil marketed by Dow-Corning Corporation. To serve most effectively, coupling chambers CC, CC' each have substantially the same relative volume.

A tube T comprised of a series of turns of copper or like tubing 56 and its connecting passageways 58, 60, 62, 64 is in open communication with the coupling chambers CC, CC' and thus intercommunicates the opposite faces of piston P. Said tube T is of relatively short length in the form shown at FIGS. 1–4, say less than about one-quarter of the wavelength of sound at the maximum operating frequency of the system, and provides the substantial inertial component of impedance characteristic of the invention. Tube T as shown is arranged in the case C, although if desired it can be arranged as well in the piston P (and is thus shown in the schematic of FIG. 5) without any substantial change in impedance characteristics.

As will be understood, a gaseous medium such as air, or other appropriate gas such as carbon dioxide, helium, or the like, fills the coupling chambers CC, CC', and the tube T. The between-diaphragm space 54 is also filled with such gas if liquid is not used therein.

In a manner conventional per se in this type of instrument, an armature 66 stands out axially from one end of the suspended mass P, and relative movement thereof is sensed by an output coil 68 arranged in the end cap 22.

Figure 8:
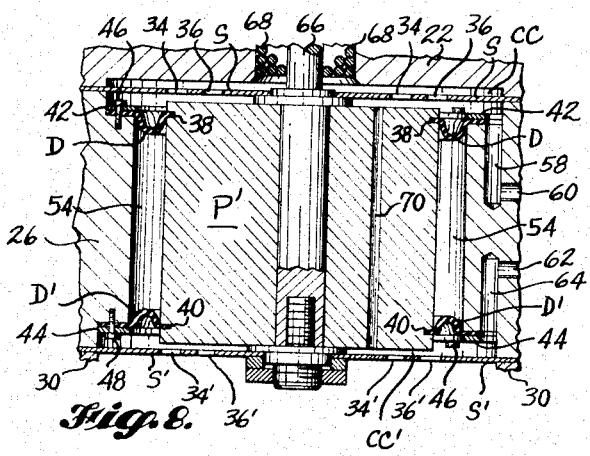
FIG. 8 is a fragmentary cross-sectional view of the suspended mass of a linear accelerometer like that shown in FIGS. 1–3 except that the suspended mass incorporates a resistive damping impedance in the form of a capillary bore.
Figure 9:
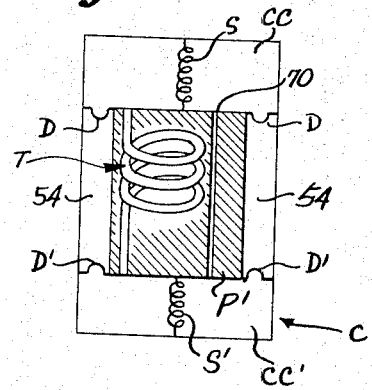
FIG. 9 is a diagrammatic view similar to FIG. 5, showing the dynamic elements of the system shown at FIG. 8.

FIG. 8 illustrates in fragmentary cross-section a slightly modified form of linear accelerometer according to the invention, wherein the gas pumped between the coupling chambers CC, CC' is also utilized to provide a degree of auxiliary damping. In this form of the invention, the suspended mass P' is provided with a capillary bore 70 which serves as a primarily resistive auxiliary passageway in conjunction with the substantially inertial gas flow passageway provided by the tube T. As will be apparent, the capillary bore 70 is arranged in parallel flow path with the tube T.

Figure 12:
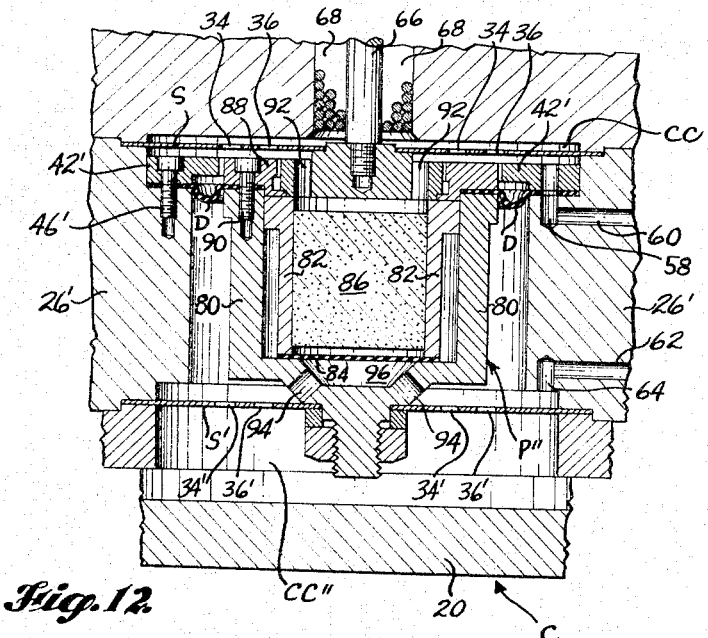
FIG. 12 is an enlarged fragmentary cross-sectional view of the suspended mass of an accelerometer like that shown at FIGS. 1–3, except that this modified form of accelerometer includes damping elements comprised of a porous plug and a rubber diaphragm.
Figure 13:
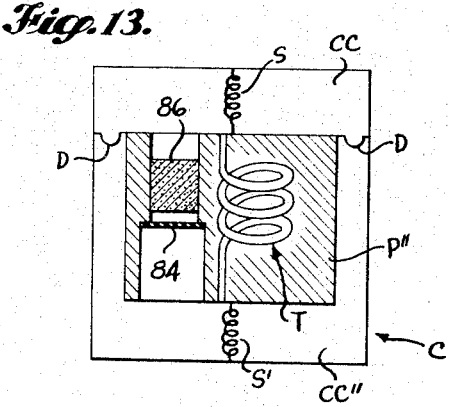
FIG. 13 is a diagrammatic showing of a dynamic system including the damping mechanism shown at FIG. 12.

FIG. 12 presents in fragmentary cross-sectional view yet another form of accelerometer according to the invention, the suspended mass P'' in this instance being comprised of an outer shell 80 and a concentrically arranged inner shell 82, between which is clamped an imperforate rubber diaphragm 84, the inner shell 82 carrying a porous plug 86 in series flow arrangement with the rubber diaphragm 84. To facilitate assembly of the components, the suspended mass P″ further comprises a removable end plate 88 attached by bolts 90 to the outer shell 80, between which the inner edge of diaphragm D is clamped (a single sealing diaphragm D being used to define a single coupling chamber CC in this instance), and the outer edge of the diaphragm D is clamped by ring 42′ and bolts 46′ to the annular mounting member 26′. Apertures 92 place one end of porous plug 86 in open communication with coupling chamber CC and aperture 94 and chamber 96 place one side of rubber diaphragm 84 in open communication with the chamber CC″ (which is not a coupling chamber in view of its relatively large size), with the result that as oscillatory movement of mass P generates cyclic pressure differentials between the chambers CC, CC″, cyclic gas flow occurs through porous plug 86 to the extent permitted by flexure of diaphragm 84. The porous plug 86 and diaphragm 84 thus provide an auxiliary flow path for the gaseous medium, which is in parallel with the flow path through the tube T. As more specifically discussed below, porous plug 86 acts as a primarily resistive element and the diaphragm 84 acts somewhat as a valve, sealing the porous plug when the frequency of oscillation is low and opening it when the frequency is high.

Figure 1:
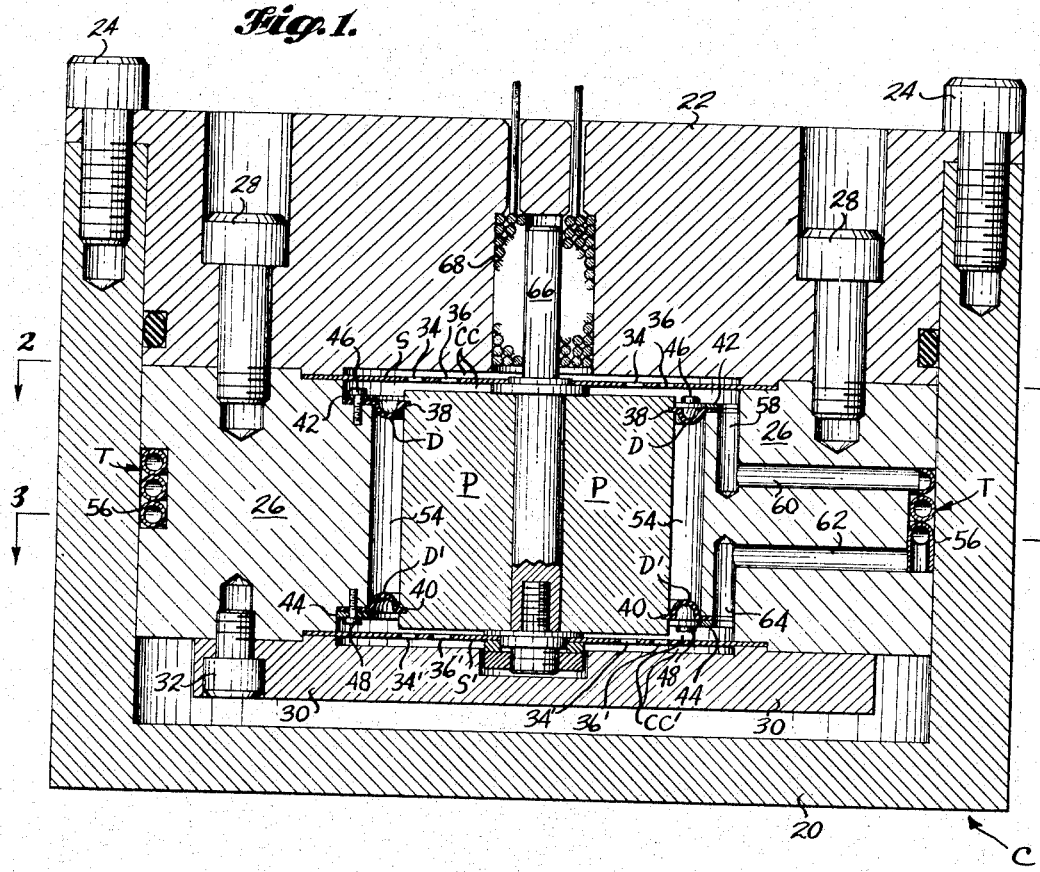
FIG. 1 is a view in longitudinal cross-section, with certain elements shown in elevation, of a typical form of linear accelerometer embodying the invention.
Figure 16:
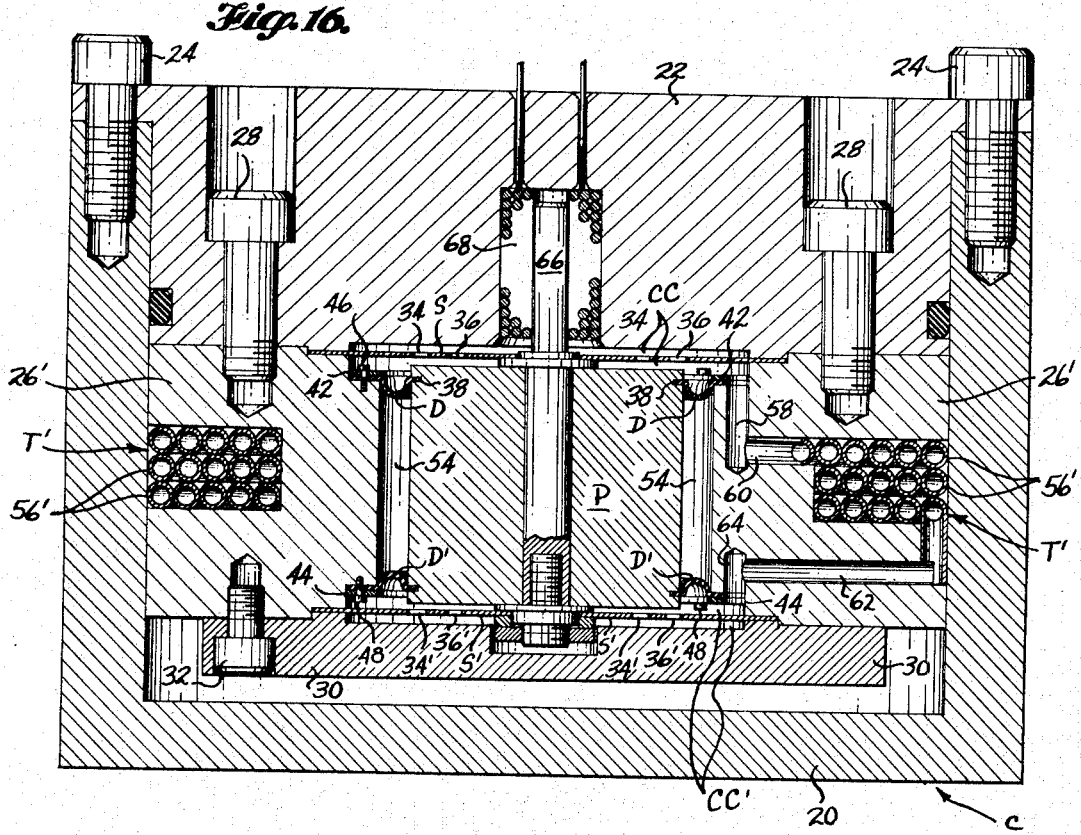
FIG. 16 is a fragmentary view of a further form of the invention, incorporating a passageway means between the coupling chambers of sufficient length to be resonant at the resonant frequency of the system.

FIG. 16 is a cross-sectional view of yet another typical form of the invention, wherein the components are identical to those shown in FIG. 1 except that the number of turns of the tubing 56′ making up the tube T′ have been increased to make tube T′ one wavelength long at the resonant frequency of the system. As will be more fully discussed below, when the tube T′ is of a length to be an acoustically resonant frequency when the system is resonant, the column of air in the tube T′ has at the resonant frequency an essentially resistive impedance and also effectively damps the system at this frequency.

The foregoing brief descriptions of the constructional arrangement of certain accelerometers typifying various forms of the invention are in summary seen to involve (in FIGS. 1–4) an inertial gas flow path (tube T) without auxiliary damping, to involve (in FIG. 8) an inertial gas flow path (tube T) and damping with a simple resistive element (capillary bore 70), to involve (in FIG. 12) an inertial gas flow path (tube T) with damping by a resistive element (porous plug 86) and series elastic septum (diaphragm 84), and to involve (in FIG. 16) an inertial gas flow path (tube T‴) of sufficient length to be resonant and thereby provide low impedance resistive damping at the resonant frequency of the system.

Presented below are more detailed treatments of various analytical and design considerations applicable to motion sensing devices of the present invention. In view of the length thereof, various sections are given separate subheadings and presented in the following order:

List of Symbols
Response Equations
Chamber Pressure
Critical Frequencies
Damping, General Considerations
Damping With Simple Resistive Element
Damping With Resistive Element and Series Spring
Damping With Resonant Tube
Diaphragm Design Considerations
Typical Test Data In the discussions below of certain theoretical considerations pertaining to the present invention, the symbols used are defined as follows:

List of symbols $A_e$—Effective area of diaphragm and piston face
$a_T$—Radius of tube T
$b$—Imaginary part of propagation constant of the tube
$C_1$, $C_2$, $C_3$—Capacitances in equivalent circuits
$c$—Velocity of sound
$E$—Applied voltage
$F$—Force on suspended mass (piston P)
$f$—Applied frequency
$f_a$—Anti-resonant frequency
$f_n$—Natural frequency
$f_r$—Resonant frequency
$h$—Damping ratio
$I_T$—Inertance of tube
$j$—$\sqrt{-1}$
$K$—Combined stiffness of two springs S
$k$—Bulge rate of diaphragms $$D, D' \cdot \left(k = V_P - V_F \frac{X_P}{X_F}\right)$$

$L_T$—Tube length
$L_G$—Peripheral gap length
$L_1$, $L_2$—Inductances in equivalent circuits
$M$—Static mass of suspended mass
$N$—Number of tubes in parallel
$n$—Reciprocal of relative response at $f_r$
$p$—Ratio of effective dynamic mass of the gas to the solid mass
$p_0$—Static pressure
$p_1$, $p_2$, $p_3$—Alternating components of chamber pressure
$q$—Ratio of effective chamber stiffness to total stiffness $S_T$
$q_1$—Charge on condenser $C_1$ in equivalent circuit
$R_D$—Flow resistance of damping element
$R_e$—Reynolds number
$R_T$—Resistance of tube
$R_2$, $R_3$—Resistances in equivalent circuits
$S_A$—Cross-sectional area of tube
$S_G$—Perimeter of peripheral gap
$S_T$—Total stiffness of springs plus diaphragms
$s$—Ratio between total stiffness ($S_T$) and stiffness of one diaphragm ($1/X_F$)
$t_G$—Width of peripheral gap
$U$—Volumetric flow rate
$U_1$—Volumetric flow rate at the input end of the tube
$V_F$—Diaphragm volume displaced per unit central load (diaphragm stiffness equals $1/X_F$)
$V_P$—Diaphragm volume displaced per unit pressure
$V_T$—Volume of tube
$V_0$—Chamber volume
$\Delta V_1$ $\Delta V_2$—Increments of chamber volume
$X$—Displacement of instrument case in space
$X_F$—Diaphragm central deflection per unit central load
$X_P$—Diaphragm central deflection per unit pressure
$X_T$—Reactance of tube
$x$—Piston displacement relative to case
$x_{peak}$—Static displacement of piston
$Z_L$—Characteristic impedance per unit area of tube
$Z_T$—Impedance of tube
$\alpha$—Propagation constant of tube
$\beta$—$\sqrt{\omega/2\nu}$
$\gamma$—Ratio of specific heats
$\epsilon$—Frequency relative to $f_r$
$\epsilon_n$—Value of $\epsilon$ at $f_n$
$\lambda$—Wavelength of sound
$\mu$—Viscosity
$\nu$—Kinematic viscosity
$\rho_0$—Gas density at unit pressure
$w$ or $\omega$—Angular frequency
($w_a = 2\pi f_a$, $w_n = 2\pi f_n$, $w_r = 2\pi f_r$)

Response equations

Figure 6:
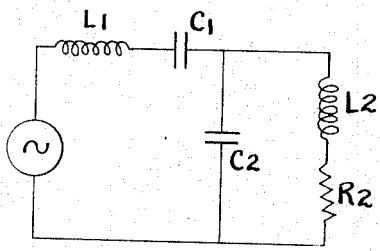
FIG. 6 is a schematic showing of the equivalent circuit of the system shown in FIG. 5.

The essential elements of the instrument shown at FIGS. 1–4 are diagrammatically presented at FIG. 5, and the equivalent electrical circuit thereof is shown at FIG. 6.

To deal with the theoretical considerations of this dynamic system, it is first assumed that the tube T is short as compared with the wavelength of sound throughout the working frequency range of the instrument. The tube T can then be treated as a lumped impedance because the motion of the gas has essentially the same phase at all points. If $p_1$ and $p_2$ are alternating components of the gas pressure in the respective coupling chambers CC, CC' and U is the volumetric flow rate in the tube T, the tube impedance $Z_T$ is defined by the equation $$U = \frac{p_2 - p_1}{Z_T} \quad (1)$$

The volume displacement in tube T is $$\frac{U}{j\omega} = \frac{p_2 - p_1}{j\omega Z_T} \quad (2)$$

Because of flow through the tube T, the mass of gas in either of the chambers CC, CC' is not constant. But, in order to apply Boyle's law, the gas efflux is best expressed in terms of the equivalent volume change. So the total volume change $\Delta V_1$ and $\Delta V_2$ of the two chambers CC, CC' can be written $$-\Delta V_1 = V_F \frac{F}{2} - V_p(p_1 - p_3) + \frac{p_2 - p_1}{j\omega Z_T} \quad (3)$$

$$-\Delta V_2 = -V_F \frac{F}{2} + V_p(p_3 - p_2) - \frac{p_2 - p_1}{j\omega Z_T} \quad (4)$$

where F is the force on the piston P, and $V_F$, $V_p$ are parameters of the diaphragm D, D'. If the chamber is sufficiently thin to assure isothermal compression, Boyle's law applied and can be written in the form $$p_1 = -p_0 \frac{\Delta V_1}{V_0} \quad (5)$$

and $$p_2 = -p_0 \frac{\Delta V_2}{V_0} \quad (6)$$

In Equations 5 and 6 $p_0$ is the static pressure in the case and $V_0$ the volume of either chamber with piston P undeflected.

It follows from the diaphragm parameters $X_F$ and $X_P$ that the piston displacement $x$, if the two diaphragms are identical, is $$x = X_F \frac{F}{2} + X_p \frac{p_2 - p_1}{Z} \quad (7)$$

The force exerted on the piston P, exclusive of gas pressure is $$F = M(\ddot{X} - \ddot{x}) - Kx \quad (8)$$

where M is the mass of the piston and K is the combined stiffness of the two springs S, S'. To derive the response equation of the instrument from Equations 1 through 8, $\Delta V_1$ is eliminated from Equations 3 and 5 and $\Delta V_2$ from Equations 4 and 6, then $$\frac{V_0}{p_0} p_1 = V_F \frac{F}{2} - V_p(p_1 - p_3) + \frac{p_2 - p_1}{j\omega Z_T} \quad (9)$$

and $$\frac{V_0}{p_0} p_2 = -V_F \frac{F}{2} + V_p(p_3 - p_2) - \frac{p_2 - p_1}{j\omega Z_T} \quad (10)$$

Combining Equations 9 and 10 we get $$\frac{V_0}{p_0}(p_1 - p_2) = V_F F - V_p\left(p_1 - p_2 - Z\frac{p_1 - p_2}{j\omega Z_T}\right) \quad (11)$$

By eliminating $p_1 - p_2$ and F from Equations 7, 8 and 11, then $$\left(\frac{V_0}{p_0} + V_p + \frac{2}{j\omega Z_T}\right)$$
$$= \left[\left(\frac{V_0}{p_0} + \frac{2}{j\omega Z_T}\right)\frac{X_F}{X_P} - V_F\right][M(\ddot{X} - \ddot{x}) - Kx] \quad (12)$$

By writing $\ddot{x} = w^2 x$ and rearranging terms this becomes $$M\ddot{X} = \left[K - Mw^2 + \frac{\frac{V_0}{p_0} + V_P + \frac{2}{j\omega Z_T}}{\frac{X_F}{2}\left(\frac{V_0}{p_0} + V_P + \frac{2}{j\omega Z_T} - \frac{X_P}{X_F}V_F\right)}\right]X \quad (13)$$

The bulge rate $k$ of the diaphragm is the volume displacement thereof per unit pressure when the center of the diaphragm is held motionless (cf. discussion of "bulge volume" in Stedman U.S. Pat. No. 2,909,364). The bulge rate $$k = V_P - V_F \frac{X_P}{X_F}$$

as derived in Statham Laboratories Instrument Notes No. 31, dated January, 1957, and published by Statham Instruments Co., Los Angeles, California.

Substituting $V_P = k + V_F X_P / X_F$ and $S_T = K + 2/X_F$ we get the final result $$M\ddot{X} = \left[S_T - M\omega^2 + A_e^2 \frac{j\omega Z_T \frac{2p_0}{V_0 + kp_0}}{j\omega Z_T + \frac{2p_0}{V_0 + kp_0}}\right]X \quad (14)$$

The instrument response at zero frequency is $M\ddot{X}/S_T$, so the response of the instrument relative to response at zero frequency is relative response =

$$\left[1 - \frac{M\omega^2}{S_T} + \frac{A_e^2}{S_T} \frac{j\omega Z_T \frac{2p_0}{V_0 + kp_0}}{j\omega Z_T + \frac{2p_0}{V_0 + kp_0}}\right]^{-1} \quad (15)$$

Equation 14 is in the familiar form, with the ratio between driving force and displacement appearing as the sum of a stiffness, a mass reactance, and an expression resulting from gas pressure acting on the piston. The latter is in the form of product divided by sum, showing that the impedances of chamber and tube act in parallel, sharing the flow of gas displaced by the piston.

Because of the presence of a coupling chamber at each end of the piston, the stiffness contributed by the chambers themselves, $2p_0/V_0$, is just double the value $p_0/V_0$, which would be obtained with one coupling chamber. Furthermore, the presence of two diaphragms halves the flow resulting from "bulge". So the final result, as indicated in Equations 14 and 15, is a stiffness term $$\frac{2p_0}{V_0 + kp_0}$$

just double what would be expected from a single chamber and diaphragm. In practice, either one diaphragm or two diaphragms can be employed depending on the instrument configuration. In the former case the total stiffness $S_T$ would be $K + 1/X_F$ instead of $K + 2/X_F$. It should be noted that when speaking of a single diaphragm configuration, it is assumed that the volume of one chamber is much larger than $V_0$. If both have a volume $V_0$, the stiffness term becomes $$\frac{2p_0}{V_0 + 2kp_0}$$

But this is not a practical configuration because the peripheral gap thereof has to be very narrow in order to keep $V_0$ sufficiently small. Another point to be noted is that, because of symmetry, the motions of the two diaphragms, including bulge, are equal and opposite. It follows that the volume of chamber 54 remains constant, so $P_3 = 0$. Accordingly, the following analysis is presented in terms of the two diaphragm configuration.

*Chamber pressure*

An expression for the alternating component of chamber pressure is next derived. The force on the piston P which will just balance the differential gas pressure is $(P_1-P_2) A_e$. It follows from Equation 14 that $$p_1-p_2=2p_1=A_e\frac{j\omega Z_T\frac{2p_0}{V_0+kp_0}}{j\omega Z_T\frac{2p_0}{V_0+kp_0}}x \quad (16)$$

Substitution of Equation 16 in Equation 15 gives $$\text{relative response}=\left[1-\frac{M\omega^2}{S_T}+\frac{2A_e}{S_Tx}p_1\right]^{-1} \quad (17)$$

Solving for $p_1$ we get $$p_1=\frac{S_Tx}{2A_e}\left[\frac{1}{\text{relative response}}-1+\frac{M\omega^2}{S_T}\right] \quad (18)$$

If $x_{\text{peak}}$ designates the static deflection, then the displacement at any frequency due to an alternating acceleration of the same magnitude is $$x=x_{\text{peak}}\text{ (relative response)} \quad (19)$$

So Equation 18 can be written $$p_1=\frac{S_Tx_{\text{peak}}}{2A_e}\left[1-\text{relative response}\left(1-\frac{M\omega^2}{S_T}\right)\right] \quad (20)$$

*Critical frequencies*

In order to visualize the frequency response of an instrument of the type shown at FIG. 1, it is necessary to expand Equation 14 into its real and imaginary parts. If the tube T is short compared with the wavelength of sound, the compressibility of the gas can be neglected and an expression of the impedance contains only a resistance and an inertance; $Z_T=R_T+j\omega I_T$.

Substitution into Equation 14 gives $$M\ddot{X}=\left[S_T-M\omega^2+A_e^2\frac{2p_0}{V_0+kp_0}\frac{\omega^2R_T^2+\omega^2I_T\left(\omega^2I_T-\frac{2p_0}{V_0+kp_0}\right)}{\left(\frac{2p_0}{V_0+kp_0}-\omega^2I_T\right)^2+\omega^2R_T^2}\right.$$

$$\left.+jA_e^2\frac{2p_0}{V_0+kp_0}\frac{\omega R_T\frac{2p_0}{V_0+kp_0}}{\left(\frac{2p_0}{V_0+kp_0}-\omega^2I_T\right)^2+\omega^2R_T^2}\right] \quad (21)$$

Figure 7:
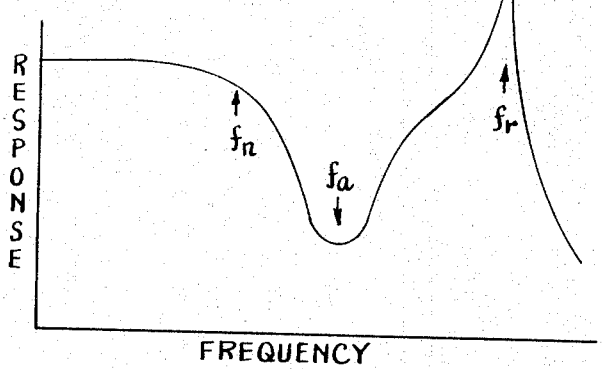
FIG. 7 is a graphical presentation showing the frequency response characteristics of the system shown at FIGS. 5 and 6.

The character of the frequency response is illustrated qualitatively in FIG. 7, and is readily interpreted in terms of the equivalent circuit shown at FIG. 6, in which $L_1$ corresponds to the solid mass M, $C_1$ to the springs, $C_2$ to the chambers, $R_2$ and $L_2$ to the tube. Since frequency degradation is of primary interest, $L_2 \gg L_1$. In order to prevent $C_2$ from short circuiting $L_2$ and $R_2$ in the working frequency range of the instrument, it is necessary to have $C_2 \ll C_1$. At low frequencies, then, the mechanism is essentially a simple spring-mass system with one degree of freedom, with $L_2$ the dominating mass and $C_1$ the dominating spring. The damping is provided by $R_2$, and the point of 90° phase shift is indicated in FIG. 7 at $f_n$. This frequency is customarily regarded as the "natural frequency" of the system. At a somewhat higher frequency $f_a$ the resonance of $C_2$ with $L_2$ provides a dip in the response, this resonance also being damped by $R_2$. Frequency $f_a$ is designated as the "antiresonant frequency." Finally at $f_r$ the impedance of $L_2$ has become so large that for practical purposes that branch of the circuit is open, and the resonance of $L_1$, with the combined stiffness of $C_1$ and $C_2$ in series therewith, is undamped. Frequency $f_r$ is designated as the "resonant frequency." To describe the same events in mechanical terms with reference to FIG. 5, the primary resonance which governs the working frequency range of the instrument is that of the air mass with the combined stiffness $S_T$ of springs S, S' and diaphragms D, D'. The dip ($f_a$) in the response curve occurs with the air mass oscillating back and forth between the chambers like a Helmholz resonator, with the piston P more or less stationary.

The high frequency peak ($f_r$) occurs with the air in the tube T essentially stationary because of its inertia, while the piston P oscillates back and forth on the air springs, with a little added stiffness from the elastic supports S, S'.

If M is essentially zero and the chamber stiffness very large, Equation 21 becomes approximately $$M\ddot{X}=[S_T-A_e^2I_T\omega^2+j\omega A_e^2R_T]x \quad (22)$$

This represents the response of a simple system wherein the natural frequency $f_n$ is given by $$f_n=\frac{1}{2\pi}\sqrt{\frac{S_T}{A_e^2M_T}} \quad (23)$$

and the damping ratio $h$ is given by $$h=\frac{A_e^2}{2S_T}R_T\omega_1=\frac{A_e}{2}\frac{R_T}{\sqrt{S_TI_T}} \quad (24)$$

The antiresonant frequency $f_a$ is very close to the frequency where the bracketed terms in the denominators in Equation 21 go to zero, that is $$f_a=\frac{1}{2\pi}\sqrt{\frac{1}{I_T}\frac{2p_0}{V_0+kp_0}} \quad (25)$$

The resonant frequency $f_r$ is essentially the natural frequency of a simple undamped system and, if $S_T$ is small compared with the chamber stiffness, then $$f_r=\frac{A_e}{2\pi}\sqrt{\frac{1}{M}\frac{2p_0}{V_0+kp_0}} \quad (26)$$

In most practical cases these approximate expressions for $f_n$, $f_a$ and $f_r$ are correct within $\pm 5\%$.

It is convenient to express the acoustical mass and acoustical stiffness as multiples $p$ and $q$ respectively of the solid mass and stiffness elements, thus $$A_e^2I_T=pM \quad p\gg 1 \quad (27)$$

$$A_e^2\frac{2p_0}{V_0+kp_0}=qS_T \quad q\gg 1 \quad (28)$$

It follows that $$f_a=\sqrt{q}f_n \quad (29)$$

$$f_r=\sqrt{pq}f_n \quad (30)$$

It is also possible to get a simple approximate expression for the relative response at $f_a$. The imaginary term in Equation 21 dominates, so substituting Equation 25 in Equation 21, $$M\ddot{X}=A_e^2\left(\frac{2p_0}{V_0+kp_0}\right)^2\frac{1}{\omega_aR_T}|x| \quad (31)$$

From Equation 24 it is seen that for seven tenths critical damping $$R_T\omega_n=\frac{1.4S_T}{A_e^2} \quad (32)$$

But from Equation 29

$$\omega_a=\sqrt{q}\omega_r$$

so $$R_T\omega_a=\sqrt{q}\frac{1.4S_T}{A_e^2} \quad (33)$$

Substituting Equations 33 and 28 in Equation 31, and using the static response $M\ddot{X}/S_T$, we get relative response at $$f_a=\frac{1.4}{q^{3/2}} \quad (34)$$

The foregoing analysis shows that the response of the instrument from zero frequency to $f_n$ is determined by the stiffness of the springs and the mass and damping of the gas column in the tube. The analysis also shows that at higher frequencies both the response and the frequency scale can be described in terms of $f_n$ and the dimensionless ratios $p$ and $q$.

*Damping, general considerations*

Figure 2:
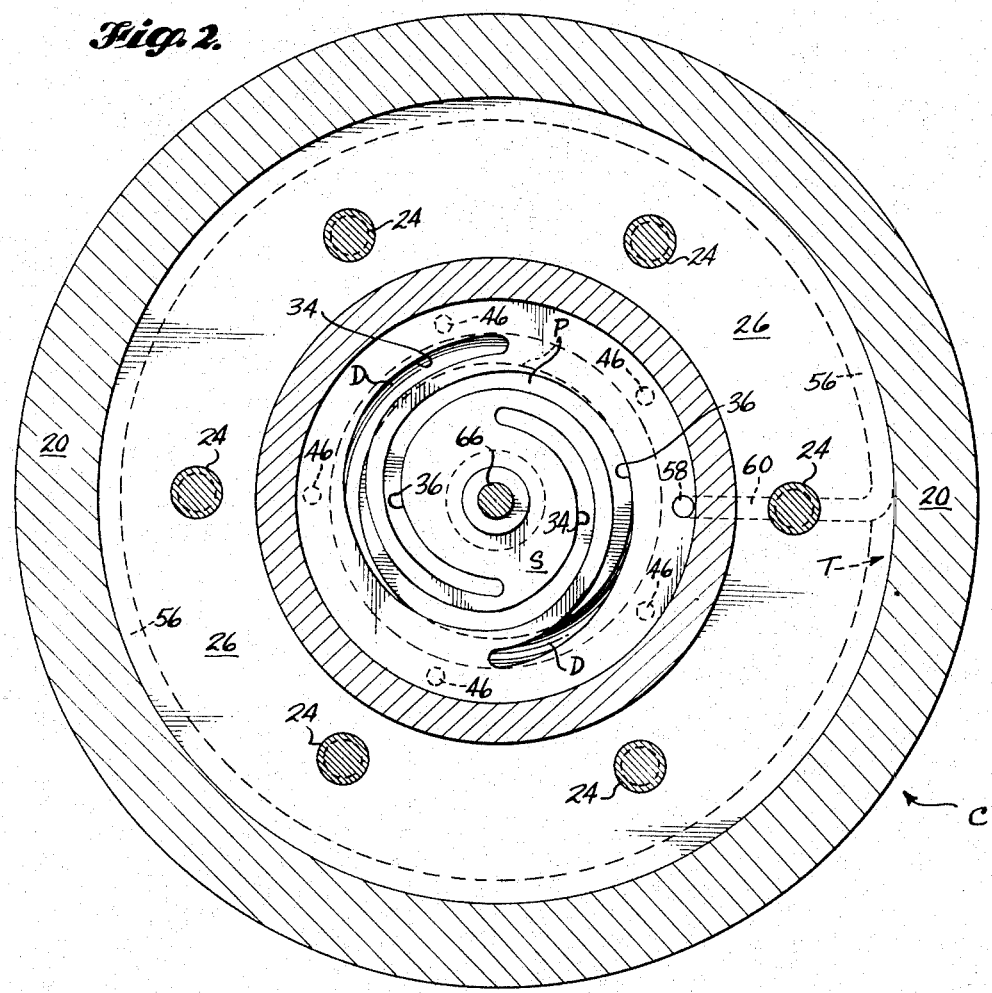
FIG. 2 is a view in lateral cross-section of the accelerometer shown in FIG. 1, taken substantially along line 2—2 thereof.
Figure 3:
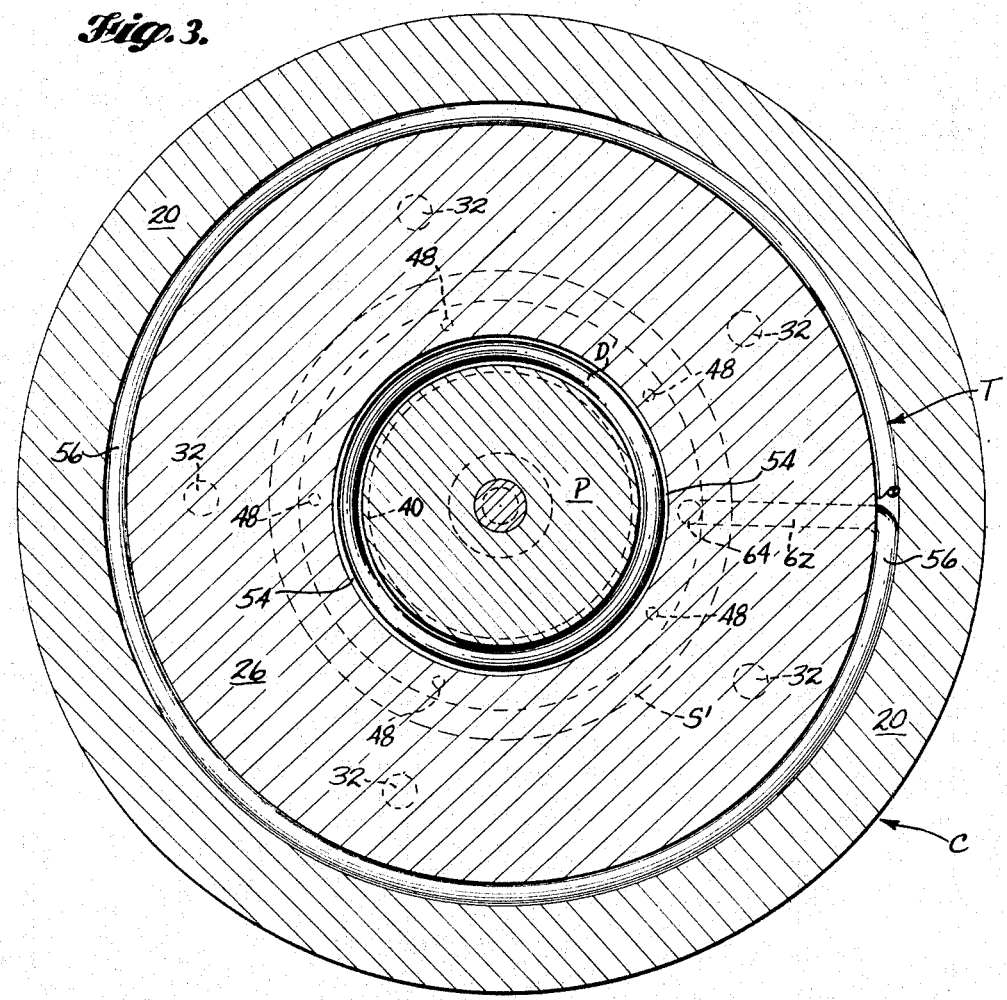
FIG. 3 is a further view in lateral cross-section of the accelerometer shown in FIG. 1, taken substantially along line 3—3 thereof.

From the above discussion it is seen that in the form of instrument shown at FIGS. 1–3 the frequency response at the two lower critical frequencies $f_n$ and $f_a$ is damped by the resistive portion of the impedance of the column of gas occupying tube T, and that the frequency response of the instrument is essentially undamped at the critical resonance frequency $f_r$. It is obviously desirable in a production instrument to effect substantial damping of the response at operating frequencies at and near the resonant frequency $f_r$.

Three alternatives for modifying the damping characteristics (i.e. the resistive impedance) of a system such as shown at FIGS. 1–6 are to be considered. One technique is the employment of a simple resistive element, such as a capillary tube or a porous plug providing a second passageway means intercommunicating the coupling chambers CC, CC', i.e. in parallel with the tube T. Such a resistive element is shown as capillary bore 70 in FIG. 8. As is shown in the following more detailed analysis of this form of resistive damping element ($R_D$), such is effective in providing a degree of auxiliary damping, but has the drawback that the inertance of the column of gas occupying tube T has to be markedly increased in order to hold the desired characteristics with respect to the natural frequency $f_n$. For this reason, and because of the better alternatives detailed below, use of a simple resistive element $R_D$ to damp the response at and near the resonant frequency $f_r$ is considered impractical.

A second damping technique which may be used to improve response characteristics in the $f_r$ frequency area, without substantial adverse effect on the lowest critical frequency $f_n$, is the use of a elastic septum means and resistive element in series flow relation between the coupling chambers. Such a system, wherein the elastic septum means is in the form of a diaphragm 84 across a resistive element in the form of a porous plug 86 is shown at FIG. 12. In this form of damping mechanism, the stiffness of the elastic septum is such that its effect is negligible at frequency $f_r$, but at frequency $f_n$ the elastic septum dominates and, in effect, seals the resistive element 84.

A third method of damping the system at and near its resonant frequency $f_r$ is to make the tube T of sufficient length so as to be resonant at frequency $f_r$, thereby providing within a narrow frequency range a low, resistive impedance. Such a system is shown at FIG. 16, with the tube T' thereof being one wavelength long at frequency $f_r$.

*Damping with simple resistive element*

Figure 10:
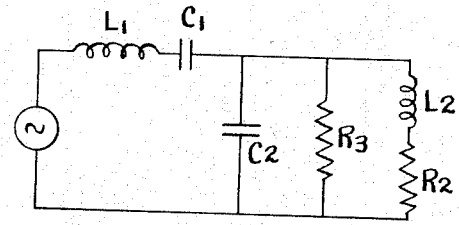
FIG. 10 is a showing of the equivalent electrical circuit corresponding to the resistively damped system shown at FIGS. 8 and 9.
Figure 11:
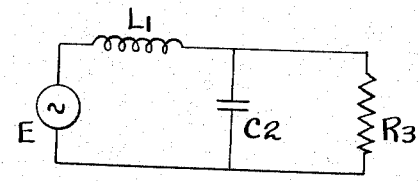
FIG. 11 is a showing of the equivalent circuit of FIG. 10 in a simplified form.

Equivalent circuits of this arrangement are shown in FIGS. 10 and 11, wherein $R_3$ is the damping resistance.

Experimentation shows that as $R_3$ is decreased, the dip at $f_a$ rises and the peak at $f_r$ falls. If $R_3$ is made small enough, the maximum and minimum vanish, and the response then decreases continuously with increasing frequency. $R_3$ also has a marked effect in reducing the rate of cutoff at low frequencies, i.e. in raising the value of $f_n$ (note the curve designated "damping with resistive element" at FIG. 15). Design considerations, when using a simple resistive elements $R_3$ for damping, involve a compromise between flattening of the $f_r$ peak, and performance in the vicinity of $f_n$.

Experimentation also shows that the frequency vs. response curves pass through a common intersection between $f_a$ and $f_r$ as $R_3$ is varied. This intersection is well above the resonance frequency of $L_1C_1$ and the resonance frequency of $L_2C_2$.

In the equivalent circuit shown at FIG. 10, the re-actance of $L_2$ is far greater than that of $C_2$, and of $L_1$ greater than that of $C_1$, so the equivalent circuit can be simplified to the form shown at FIG. 11 as a reasonable approximation.

For the implified circuit, the response equation is $$E = \left[ \frac{R_3^2 \omega^2 C_2}{R_3^2 \omega^2 C_2^2 + 1} - L_1 \omega^2 + j \frac{R_3 \omega}{R_3^2 \omega^2 C_2^2 + 1} \right] q_1 \quad (35)$$

where $q_1$ is the charge on $C_1$ (analogous to displacement $x$). The magnitude of the response is $$|q_1| = E \left[ L_1 \omega^2 + \frac{R_3^2 (1 - 2 L_1 C_2 \omega^2)}{R_3^2 \omega^2 C_2^2 + 1} \right]^{-1} \quad (36)$$

This will be independent of $R_3$ when $1 - 2 L_1 C_2 w^2 = 0$. So if the frequency of the intersection is designated $f_c$ we get $$f_c = \frac{1}{2\pi} \sqrt{\frac{1}{2 L_1 C_2}} \quad (37)$$

The undamped peak corresponding to Equation 26 is $$f_r = \frac{1}{2\pi} \sqrt{\frac{1}{L_1 C_2}} \quad (38)$$

So it turns out that the intersection occurs at a frequency given by $$f_c = f_r / \sqrt{2} \quad (39)$$

Experimentally this ratio has been shown to be about 1.40 when $L_1 = .70h.$, $L_2 = 10h.$, $C_1 = .50\mu f.$, $C_2 = .030\mu f.$, and $R_2 = 5{,}700$ ohms.

To determine the relative response at the intersection, and returning to mechanical terminology and making the approximation equivalent to that of FIG. 11, (i.e. $S_T = 0$, $M_T = \infty$), in Equation 21, then $$M \ddot{X} = \left[ -M \omega^2 + A_e^2 \frac{2 p_0}{V_0 + k p_0} \right] x \quad (40)$$

Substitute in Equation 40 $1/\sqrt{2}$ times the frequency given by Equation 26, then $$x = M \ddot{X} \left[ \frac{A_e^2}{2} \frac{2 p_0}{V_0 + k p_0} \right]^{-1} \quad (41)$$

The response at zero frequency (of the actual, not the approximate, system) is $$x = M \ddot{X} [S_T]^{-1} \quad (42)$$

So the relative response at the intersection is $$\text{relative response} = S_T \left[ \frac{A_e^2}{2} \frac{2 p_0}{V_0 + k p_0} \right]^{-1} \quad (43)$$

This can be expressed in terms of $q$ by means of Equation 28 getting $$\text{relative response} = 2/q \quad (44)$$

In the experimental case referred to following Equation 39, the theoretical relative response is 0.04 and the measured response was shown to be 0.033. This order of accuracy is considered to quite adequately justify the use of the simple formulae given in Equations 39 and 44.

The height of the resonance peak, i.e. the response at $f_r$, is of critical importance, and can be determined by the same procedure as was used to get the response at $f_c$. If the effect of a damping capillary bore 70 of resistance $R_D$ is included, Equation 40 becomes $$M \ddot{X} = \left[ -M \omega^2 + A_e^2 \frac{2 p_0}{V_0 + k p_0} \frac{R_D^2 \omega^2 \left( \frac{V_0 + k p_0}{2 p_0} \right)^2}{R_D^2 \omega^2 \left( \frac{V_0 + k p_0}{2 p_0} \right)^2 + 1} \right.$$

$$\left. + j \omega R_D A_e^2 \frac{1}{R_D^2 \omega^2 \left( \frac{V_0 + k p_0}{2 p_0} \right)^2 + 1} \right] x \quad (45)$$

The frequency of the peak, the frequency at which the real part of the bracketed expression in Equation 45 equals zero, and the frequency $f_r$, are all different but quite close together. As an approximation, the response is computed using the magnitude of the imaginary term only, evaluated at the frequency $f_r$ given at Equation 26. Then corresponding to Equation 43, we get $$\text{relative response at the peak} = S_T\left[R_D\omega_r A_e^2 \frac{1}{R_D^2\omega_r^2\left(\frac{V_0+kp_0}{2p_0}\right)^2+1}\right]^{-1} = \frac{1}{n} \quad (46)$$

The quantity $n$, defined by Equation 46, is merely an abbreviation for the reciprocal of the relative response. Substituting $w_3$ in terms of $w_1$, from Equation 30 and introducing $q$ from Equation 28 we get $$\frac{q}{n} \frac{\frac{R_D}{S_T}\sqrt{\frac{p}{q}}\omega_n A_e^2}{\frac{R_D^2}{S_T^2}\frac{p}{q}\omega_n^2 A_e^4 + 1} = 1 \quad (47)$$

Solving the quadratic for $R_D$ we get $$R_D = \frac{S_T}{A_e^2\omega_n}\sqrt{\frac{q}{p}} \frac{\frac{8}{n}+\sqrt{\frac{q^2}{n^2}-4}}{2} \quad (48)$$

The response in the high frequency region can be summarized as follows. If there is no damping resistance ($R_D=\infty$) the response rises to a high peak at the frequency $f_r=\sqrt{pq}f_n$. Regardless of the value of $R_D$, the response at the frequency $f_c = f_r\sqrt{2}$ is approximately $2/q$. The lower the damping resistance the lower will be the peak at $f_r$, the relation between $R_D$ and the relative response $1/n$ being given quantitatively by Equation 48.

As stated previously, a resistance $R_D$ of the value given by Equation 48 has a strong influence upon the response in the vicinity of $f_n$, and requires a substantial increase in the inertance of the tube. In consequence, the volume of tubing must be increased or a larger Reynolds number must be tolerated. With the other damping arrangements shown and discussed (FIGS. 12 and 16), this design compromise is avoided.

Damping with resistive element and series spring

As an alternative to increasing the inertance to get adequate damping correction, means are necessary to minimize the effect of $R_D$ in the vicinity of $f_n$ while retaining its benefits at $f_r$. This result can be approximated by incorporating an elastic septum of the proper stiffness in series with $R_D$.

Equation 30 indicates that the ratio of the two frequencies $f_n$ and $f_r$ is $\sqrt{pq}$. This ratio preferably should be at least about 15 and optimally lies in the range of about 20 to about 40. Consequently a spring which has an impedance of the magnitude $R_D$ at the geometric mean of frequencies $f_n$ and $f_r$, has an impedance from four to six times $R_D$ at $f_n$ and one quarter to one sixth of $R_D$ at $f_r$. A spring of this order of impedance acts somewhat like a valve, sealing $R_D$ when the frequency is low and opening it when the frequency is high. The higher the value of $pq$, the more effectively it will perform this function.

A form of the invention involving damping by means of a resistive element and series spring is shown at FIG. 12, wherein the mass P' includes a porous plug 86 (as $R_D$) capped by a diaphragm 84 (as the spring).

The pertinent parameter of the diaphragm 84 is its volume displacement per unit pressure, $V_P$. The optimum value is given by $$\frac{1}{V_p} = 2\pi(pq)^{1/4}f_n R_D \quad (49)$$

Figure 14:
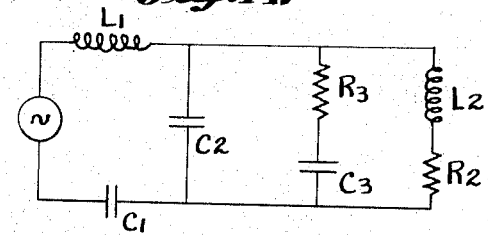
FIG. 14 is a showing of the equivalent electrical circuit of the damping system shown at FIG. 13.
Figure 15:
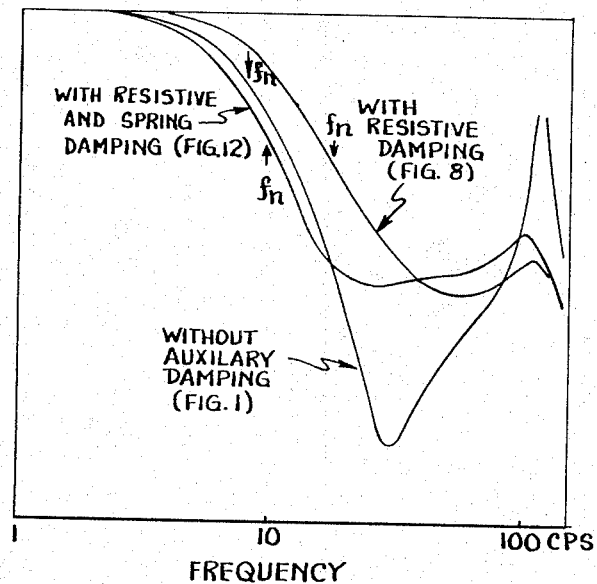
FIG. 15 is a log log graphical presentation of experimental results employing certain variations in the equivalent circuit shown at FIG. 14.
Figure 17:
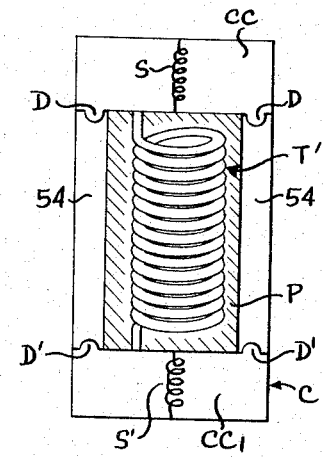
FIG. 17 is a diagrammatic showing of the dynamic system utilizing the resonant passageway means shown at FIG. 16.

In FIG. 15 comparative response curves are shown, obtained by means of the equivalent circuit shown at FIG. 14, with $L_1=.70h$, $L_2=10h$, $C_1=.50\mu f$, $C_2=.03\mu f$, and $R_2=5,700$ ohms. The first curve in FIG. 15, labeled "without auxiliary damping," shows the response with $R_3=\infty$. The second curve, labeled "with resistive damping," shows response with $R_3=10,000$ ohms and $C_3=\infty$. Note that the $f_n$ for this curve is raised markedly. The third curve, labeled "with resistive and spring damping" shows the response with $R_3=10,000$ ohms and $C_3=.05\mu f$. Note that the $f_n$ is lowered considerably as compared with the $f_n$ without $C_3$ (i.e. the spring provided by diaphragm 84). It is also to be observed that the third curve tends to follow the second curve at high frequencies and the first curve at low frequencies. The test results illustrated at FIG. 15 involve a somewhat unfavorable case, with $\sqrt{pq}=15.3$. With this figure increased the improvement in response pattern is more pronounced.

Damping with resonant tube

Up to this point the tube T has been considered as an element of constant impedance, so that its resistance and inertance are the same at $f_r$ as at $f_n$. On that basis it was concluded that the inertia of the gaseous medium would, for practical purposes, prevent any flow through the tube T at $f_r$ and, in consequence, the resonance of the suspended mass at $f_r$ would be undamped. This is true if the tube T is not more than one quarter wavelength long at frequency $f_r$. But if the instrument is designed in such a way that the tube has a resonance at $f_r$, it will provide a low resistive impedance and "spot" damping at frequency $f_r$ without detriment to the $f_n$ of the system.

The impedance of the tube T can be calculated as follows:

$$p_2 = p_1 \cos h\alpha L_T - \left(\frac{U_1 Z_L}{S_A}\right)\sin h\alpha L_T \quad (50)$$

where $L_T$ is the tube length, $\alpha$ is the propagation constant, $U_1$ is the volumetric flow rate at the input end, $S_A$ is the tube area, and $Z_L$ is the characteristic impedance per unit area. If the instrument is symmetrical, $P_2=P_1$, and $$\frac{p_1}{U_1} = \frac{Z_L}{S_A}\frac{\sin h\alpha L_T}{1+\cos h\alpha L_T} \quad (51)$$

If we let $\alpha = a+jb$, and follow the earlier notation for tube impedance, $$Z_T = R_T + j\omega I_T = \frac{2Z_L}{S_A}\frac{\sin haL_T \cos bL_T + j\cos haL_T \sin bL_T}{1+\cos haL_T \cos bL_T + j\sin haL_T \sin bL_T} \quad (52)$$

Equation 50, with appropriate value for $\alpha$ and $z_L$, has been confirmed experimentally for cases where the thickness of the boundary layer is substantially less than the radius of the tube T. That condition is satisfied in the instrument at $f_r$, but not at $f_n$. At the lower frequency, by the nature of the problem, seven tenths critical damping is required with the tube supplying both the mass and the resistance.

As an approximation, the limiting value of Equation 52, for very small values of $L_T$, is equated to the impedance that would be expected with an incompressible fluid. The former is $$\lim_{L_T \to 0} Z_T = \frac{p_0(\gamma p_0)^{1/2}}{\pi a_T^2}(a+jb)L_T \quad (53)$$

where $\gamma$ is the ratio of specific heats and $\rho_0$ the density of the gas at unit pressure. The latter is $$Z_T = R_T + j\omega I_T = \frac{8\mu L_T}{\pi a_T^4} + j\omega\frac{4}{3}\frac{\rho_0 p_0 L_T}{\pi a_T^2} \quad (54)$$

The velocity of sound is $c=(\gamma/\rho_0)^{1/2}$ so, equating the expressions in Equations 53 and 54 we get $$\left.\begin{array}{l} a=\dfrac{8\mu}{a_T^2}\dfrac{1}{\rho_0 p_0 c} \\ b=\dfrac{4}{3}\dfrac{\omega}{c} \end{array}\right\} \quad (55)$$

and $$\frac{b}{a}=\frac{1}{3}\beta^2 a_T^2 \quad (56)$$

where $$\beta=\sqrt{\omega/2\nu}$$

It is known that when both the inertia and the damping are provided by a single tube of circular cross-section, the damping ratio $h$ is given by $h=1.5/\beta_n^2 a_T^2$ where $\beta_n$ is the value of $\beta$ at the natural frequency. It follows that, at $f_n$, $$a=2hb_n \quad (57)$$

The tube should be one wavelength long at $f_r$, i.e.

$$bL_T=2\pi @ f_r \quad (58)$$

For the single diaphragm case Equation 51 becomes $$\frac{p_1}{U_1}=\frac{\mathscr{Z}_L}{S_A}\tan h\alpha L_T$$

and the tube must be one half wavelength long at $f_r$.
To facilitate numerical evaluation of Equation 52 let $$\epsilon=f/f_r \quad (59)$$

Then $bL_T=2\pi\epsilon$. Let $\epsilon=\epsilon_n$ at $f_n$, then from Equation 57 $aL_T=4\pi h\epsilon_n$. Equation 52 becomes $$\mathscr{Z}_T=\frac{2p_0\rho_0 c}{\pi a_T^2}\frac{\sin h4\pi h\epsilon_n \cos 2\pi\epsilon + j\cos h4\pi h\epsilon_n \sin 2\pi\epsilon}{1+\cos h4\pi h\epsilon_n \cos 2\pi\epsilon + j\sin h4\pi h\epsilon_n \sin 2\pi\epsilon} \quad (60)$$

In the notation of Equation 30 $\epsilon_n=(pq)^{-1/2}$ so, with $p$ and $q$ given, the trigonometric part of Equation 60 can easily be computed as a function of frequency relative to $f_r$. The impedance is periodic in $\epsilon$, with $$Z_T(\epsilon)=Z_T(\epsilon+1)$$

the locus in the complex plane is a circle.

Figure 18:
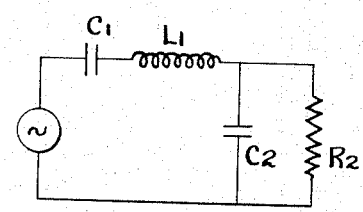
FIG. 18 is a showing of the equivalent electrical circuit at resonant frequency $f_r$ of the system shown at FIG. 16.

The effect of a tube impedance of this sort upon the response of the instrument can be treated in a qualitative way. In the light of Equations 29 and 30, if the frequency degradation ratio of the instrument, $\sqrt{p}$, is three or more, the response is affected very little by the tube resonance in the frequency range from $f=0$ to $f=f_a$. At $$f_r/2 (L_T=\lambda/2)$$

the impedance is resistive instead of inertial, but still quite large and dominated by the considerably smaller shunt impedance of the chambers (note FIG. 6). Only in the vicinity of $f_r$ will the resonance of the tube affect the response markedly. To evaluate its effect at $f_r$, note that the resistance of the tube has essentially the same value at $f_n$ and at $f_r$. The equivalent circuit at frequency $f_r$ is given in FIG. 18.

For half critical damping at $f_n$, $R_2\omega_n=1/C_1$. Therefore, since $qC_2=C$, and $\omega_r=\sqrt{pq}\omega_n$ $$R_2\omega_r C_2=\sqrt{\frac{p}{q}} \quad (61)$$

Since $R_2$ and $C_2$ are in parallel $R_2$ must not be much larger than $1/\omega_r C_2$ or there will be little damping. On the other hand if $R_2$ is much smaller than $1/\omega_r C_2$ the effective stiffness of $C_2$ is reduced and $f_r$ is degraded. Permitting a ratio of about 1.4:1 in both directions, Equation 61 shows that the quantity $p/q$ must lie in the range from about ½ to 2.

*Diaphragm design considerations*

The effective chamber volume is the sum of the physical volume $V_0$ plus the simulated volume $kp_0$ caused by bulge of the diaphragm or diaphragms which seal the peripheral gap. The governing relationship is $$p_0=\frac{V_0}{\dfrac{2A_e^2}{qS_T}-k} \quad (62)$$

Letting the ratio between total stiffness and the stiffness of one diaphragm be represented by $s$, and letting the ratio between the second and first terms in the denominator of Equation 62 be represented by B; then $$S_T X_F=s \quad (63)$$

$$\frac{qS_T}{2A_e^2}k=B \quad (64)$$

Elimination of $S_T$ between Equations 63 and 64 gives $$\frac{qs}{2B}=\frac{A_e^2 X_F}{k} \quad (65)$$

It follows that $A_e^2 X_F = V_F - k$, so $$\text{Bulge ratio}=\frac{V_F}{k}=1+\frac{qs}{2B}\approx\frac{qs}{2B} \quad (66)$$

If all the stiffness is in the diaphragms D, D′, then $s=2$. If $Kp_0 \gg V_0$, $B=1$. The bulge ratio must then be approximately equal to $q$, and is the smallest acceptable value under any given circumstances. Reasonable values of $q$ for acceptable high frequency attenuation are in the range 20–30. With the values of armature travel required by the transducer, there can be difficulty making $kp_0 \gg V_0$; a more feasible condition is $kp_0 = V_0$. Then B equals ½ and the bulge ratio equals $2q$.

A practical approach to the problem of satisfying the high bulge ratio requirement is to use thin diaphragms of silicone rubber, with their shortcomings as springs being masked by additional metal springs of much greater stiffness. By way of illustration, if one diaphragm is permitted to contribute 5% of the total stiffness, then $s=20$. The required bulge ratio is then 400 to 600. A diaphragm of the type shown in FIG. 4 can be made to have a stiffness of about 4.0 lb./inch with a bulge ratio of about 400.

With regard to temperature effects, the density of the gas in the instrument is essentially independent of temperature and the natural frequency is accordingly essentially independent of temperature except for the variation of the modulus of the spring material.

The damping ratio is proportional to gas viscosity which, for air, is approximately proportional to the 0.7 power of absolute temperature. From −40° F. to 165° F. viscosity will increase by a factor of 1.32, from −50° F. to 250° F. by a factor of 1.47. If the diaphragms have an appreciable bulge rate, there can be some detuning because of variation of the effective chamber volume $V_0+kp_0$, as $p_0$ changes. If $V_0=kp_0$ at room temperature, the effective volume changes by a factor of about 1.2 from −40° F. to 165° F. The variation of $f_r$ would be about 5%. The resonance of the tube T′ can be made sufficiently broad to readily accommodate this amount of detuning.

*Typical test data*

An experimental "breadboard" instrument with the following parameters was tested:

$S_T=4.2\times 10^6$ dyne/cm.
$M=38$ gm.
$A_e=6.4$ cm.$^2$
$a_T=0.081$ cm.
$L_T=105$ cm.
$V_0=0.042$ cu. in.
$k=0.0029$ cu. in. per p.s.i.
$q=9.6$ $p = 19$
$p_0 = 29$ p.s.i. (nominal)

Figure 19:
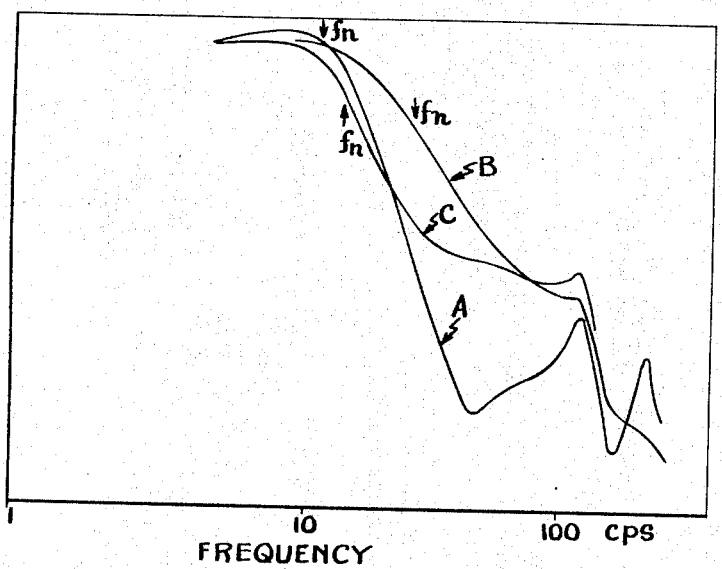
FIG. 19 is a log log graphical presentation of further experimental results, involving use of a resonant tube for inertial impedance and for damping, both singly and in conjunction with other types of damping elements.

The instrument was a single diaphragm configuration with the volume of one coupling chamber much larger than $V_0$. The tube length was adjusted for resonance at $f_r$ and in addition a shunt resistance damper was tested with and without a series spring. In FIG. 19, curve A was obtained with the damping resistance sealed, so that only resonant tube damping was effective.

Curve B shows the response with the damping resistance unsealed, the instrument being otherwise unchanged. The resistance was in the form of a porous plug with flow resistance 0.49 p.s.i. per cu. in./sec. The plug resistance is lower than the tube impedance throughout most of the frequency range above $f_n$. Consequently it dominates the response. The increase of $f_n$, observed previously in tests with the equivalent circuit, is apparent.

Curve C shows the response with the diaphragm in series with the porous plug. The volumetric spring rate was 350 p.s.i. per cu. in. The tendency for this curve to follow curve B at high frequency and curve A at low frequency is evident. The $f_n$ is improved, but not fully restored to the curve A value. Because of the small $q$ of this instrument, the frequency ratio between $f_r$ and $f_n$ is only about 14:1. This is not enough separation of these frequencies to permit a complete separation of the high frequency and low frequency regions with an elementary spring-resistance damping mechanism. Performance is improved with increase in $q$ ratio. As earlier indicated, a higher $q$ ratio can be obtained either by the use of a fiber reinforced diaphragm to increase the bulge ratio, or by use of an oil filled peripheral gap.

The breadboard instrument described above was provided with an electrodynamic drive coil and a linear differential transformer to measure piston displacement. The natural frequency was 14 c.p.s. and the damping ratio 0.92.

From the foregoing, various further modifications, adaptations, and component arrangements characteristic of the invention will be apparent to those skilled in the art to which the invention is addressed, within the scope of the following claims.

What is claimed is:

1. In a motion sensing device of the type wherein a spring constrained suspended mass moves with one degree of freedom with respect to a case, the improvement comprising chamber means defined in part by one end of the said suspended mass and arranged so that the said end of said suspended mass moves as a piston into and out of said chamber means, passageway means intercommunicating said chamber means and the opposite end of said suspended mass, and a gaseous medium filling said chamber means and said passageway means, the dynamic mass developed by flow of the gaseous medium in said passageway means and said chamber means being greater than the static mass of said suspended mass and therefore primarily inertial in nature.

2. A motion sensing device according to claim 1, wherein dynamic mass of the gas is at least about five times greater than the static mass of said suspended mass.

3. A motion sensing device according to claim 1, wherein $p$ is the ratio of the effective dynamic mass of the gas to the static mass of the suspended mass, $q$ is the ratio of the effective chamber stiffness to the total stiffness of the dynamic system, and the value of the ratio $p/q$ is in the range of from about ½ to about 2.

4. A motion sensing device according to claim 3, wherein the ratio $p$ is at least about 15.

5. A motion sensing device according to claim 3, wherein the ratio $q$ is of a value in the range of from about 20 to about 30.

6. In a motion sensing device having a suspended mass constrained by spring means to move with one degree of freedom with respect to a case, the improvement for degrading the natural frequency of the device, said improvement comprising; passageway means intercommunicating between the opposite faces of said suspended mass, chamber means defined in part by one face of the said suspended mass and arranged so that the said face of said suspended mass moves as a piston into and out of said chamber means, flexible diaphragm means forming seal means between said mass and said case, and a gaseous medium filling said passageway means and said chamber means, the said passageway means and said chamber means being proportioned so that the dynamic mass of the gaseous medium therein is greater than the static mass of said suspended mass and therefore primarily inertial in nature.

7. A motion sensing device comprising a suspended mass constrained by spring means to move with one degree of freedom with respect to a case, chamber means defined in part by one face of the said suspended mass and arranged so that the said face of said suspended mass moves as a piston into and out of said chamber means, flexible diaphragm means constituting seal means between said mass and said case, passageway means between said chamber means and the opposite end of said suspended mass, and a gaseous medium filling said passageway means and said chamber means, the flow of the gaseous medium therein being primarily inertial in nature and providing a dynamic mass greater than the static mass of said suspended mass.

8. A motion sensing device comprising a suspended mass constrained by spring means to move with one degree of freedom with respect to a case, flexible diaphragm means constituting seal means between said mass and said case, chamber means defined in part by said diaphragm means and in part by one face of the said suspended mass and arranged so that the said face of said suspended mass moves as a piston into and out of said chamber means, passageway means between said chamber means and the opposite end of said suspended mass, primarily inertial damping means comprising a gaseous medium filling said passageway means and said chamber means and providing therewith a dynamic mass greater than the static mass of said suspended mass, and auxiliary damping means providing a gas flow path in parallel with said passageway means.

9. A motion sensing device according to claim 8, wherein said auxiliary damping means is characterized by a primarily resistive impedance.

10. A motion sensing device according to claim 8, wherein said auxiliary damping means comprises a capillary bore.

11. A motion sensing device according to claim 8, wherein said auxiliary damping means comprises a porous plug.

12. A motion sensing device according to claim 8, wherein said auxiliary damping means comprises elastic septum means in series flow relation with a gas flow passageway having a primarily resistive impedance.

13. A motion sensing device according to claim 12, wherein said auxiliary damping means comprises gas flow path means, one end of which is in open communication with said chamber means and the other end of which is in open communication with a flexible diaphragm serving as said elastic septum means.

14. A motion sensing device according to claim 12, wherein the impedance of the primarily resistive gas flow passageway is of the same magnitude as that of said elastic septum means at substantially the geometric mean of the natural frequency and the resonant frequency of the dynamic system.

15. A motion sensing device comprising a suspended mass constrained by spring means to move with one degree of freedom with respect to a case, flexible diaphragm means constituting seal means between said mass and said case, chamber means defined in part by said diaphragm means and in part by one face of the said suspended mass and arranged so that the said face of said suspended mass moves as a piston into and out of said chamber means, passageway means between said chamber means and the opposite end of said suspended mass, and a gaseous medium filling said passageway means and said chamber means and providing therewith a dynamic mass greater than the static mass of said suspended mass, the said passageway means being of a length to be resonant at substantially the resonant frequency of the dynamic system and thereby act as a damping means at said resonant frequency.

16. In a motion sensing device having a suspended mass constrained by spring means to move axially with one degree of freedom with respect to a case, the improvement for degrading the natural frequency of the device, said improvement comprising; passageway means intercommunicating between the axially opposite faces of said suspended mass, chamber means defined in part by one face of the said suspended mass and arranged so that the said face of said suspended mass move as a piston into and out of said chamber means, diaphragm means constructed to be substantially inextensible radially of and flexible axially of said suspended mass and arranged to provide seal means between said mass and said case, and a gaseous medium filling said passageway means and said chamber means, the said passageway means and said chamber means being proportioned so that the dynamic mass resulting from flow of the gaseous medium therein is greater than the static mass of said suspended mass and therefore primarily inertial in nature.

17. A motion sensing device according to claim 16, wherein said diaphragm means is configured to have a single fold between said case and said mass.

18. A motion sensing device according to claim 17, wherein said diaphragm means is comprised of an elastomeric material in which is laminated radially extending inextensible fibrous material.

19. A motion sensing device according to claim 18, wherein said elastomeric material is silicone rubber and said inextensible fibrous material is glass fibers.

20. A motion sensing device according to claim 10, wherein said diaphragm means is characterized by a bulge ratio of at least about 40.

21. A motion sensing device comprising a case, a piston in said case, spring means mounting said piston for movement with one degree of freedom within said case, diaphragm means defining with said piston and case a chamber at one end of said piston and a chamber at the other end of said piston, passageway means intercommunicating said chambers, and a gaseous medium filling said chambers and said passageway means, the dynamic mass of the gaseous medium occupying said passageway means and said chambers being greater than the static mass of said piston and therefore primarily inertial in nature, and thereby improving the low frequency response characteristics of the device.

22. In a linear accelerometer of the type wherein a spring constrained body is mounted to move with one degree of freedom within a case subjected to applied vibration, the improvement for lowering the natural frequency of the accelerometer comprising closed chambers at ends of the said body arranged so that said body moves as a piston into and out of said chambers when moving relatively of the chambers, passageway means intercommunicating said chambers, and a gaseous medium filling said chambers and said passageway means, the flow of the column of gas in said passageway means developing as a primarily inertial reactance and improving dynamical performance of said accelerometer, and the dynamic mass of said column of gas thereby being greater than the static mass of said body.

References Cited
UNITED STATES PATENTS

| | | | |
|---|---|---|---|
| 2,909,364 | 10/1959 | Stedman | 73—516 XR |
| 2,974,531 | 3/1961 | Ackerman | 73—516 |
| 3,065,639 | 11/1962 | Stedman | 73—515 |
| 3,190,127 | 6/1965 | Gwathmey | 73—515 |

JAMES J. GILL, *Primary Examiner.*